(12) United States Patent
Yu et al.

(10) Patent No.: US 7,360,052 B2
(45) Date of Patent: Apr. 15, 2008

(54) COMPUTER PLATFORM MEMORY ACCESS CONTROL METHOD AND SYSTEM WITH MEMORY CONFIGURATION AUTOMATIC SETTING CAPABILITY

(75) Inventors: Ling-Hung Yu, Taipei (TW); Ying-Chih Lu, Taipei (TW); Shing-Yu Chen, Taipei (TW)

(73) Assignee: Inventec Corporation (TW)

( * ) Notice: Subject to any disclaimer, the term of this patent is extended or adjusted under 35 U.S.C. 154(b) by 246 days.

(21) Appl. No.: 11/233,204

(22) Filed: Sep. 21, 2005

(65) Prior Publication Data

US 2007/0067596 A1 Mar. 22, 2007

(51) Int. Cl.
G06F 12/00 (2006.01)

(52) U.S. Cl. ...................................... 711/170; 711/171

(58) Field of Classification Search .................. None
See application file for complete search history.

(56) References Cited

U.S. PATENT DOCUMENTS

2005/0038928 A1* 2/2005 Meyer et al. .................. 710/8

\* cited by examiner

*Primary Examiner*—Donald Sparks
*Assistant Examiner*—Horace L. Flournoy
(74) *Attorney, Agent, or Firm*—Peter F. Corless; Steven M. Jensen; Edwards Angell Palmer & Dodge LLP

(57) ABSTRACT

A computer platform memory access control method and system is proposed, which is designed for use with a computer platform, such as a network server, for providing the server with a memory access control function with a memory configuration automatic setting capability, which is characterized by the arrangement of a configuration data exchange path between a memory control chip and an I/O control chip on the server's motherboard, so as to allow a set of memory specification data stored in an I/O configuration register of the ICH I/O control chip to be mapped via the configuration data exchange path to a memory configuration register of the memory control chip, such that a memory access action can be performed based on the memory specification data mapped from the I/O control chip. This feature allows the operation and network management of servers to be made more efficient.

6 Claims, 3 Drawing Sheets

US 7,360,052 B2

COMPUTER PLATFORM MEMORY ACCESS CONTROL METHOD AND SYSTEM WITH MEMORY CONFIGURATION AUTOMATIC SETTING CAPABILITY

BACKGROUND OF THE INVENTION

1. Field of the Invention

This invention relates to information technology (IT), and more particularly, to a computer platform memory access control method and system which is designed for use in conjunction with a computer platform, such as a network server equipped with a Lindenhurst chipset developed by the Intel Corporation of USA, for providing the server with a memory configuration automatic setting capability that allows the server to automatically set the required memory configuration in the event that the server's primary memory is changed from one type to another, such as from DDR-266 MHz (where DDR=Double Data Rate) memory to DDR-333 MHz memory, so that the server can work with the newly-installed memory without manual setting by the user.

2. Description of Related Art

Lindenhurst chipset is a memory control chipset developed by the Intel Corporation of USA, which is specifically designed for use with a dual-processor computer architecture and capable of supporting a wide variations of memory modules, such as DDR-266 MHz and DDR-333 MHz memory modules (where DDR=Double Date Rate).

Presently, the Lindenhurst chipset utilizes a manual method for setting memory configurations by the network management personnel. By this manual method, the network management personnel needs to flip a set of jumpers to a specified pattern for setting the internal configuration register to indicate whether the currently-installed memory unit is DDR-266 MHz or DDR-333 MHz.

One drawback to the forgoing jumper method for setting memory configurations, however, is that it is quite tedious, laborious, and timing-consuming to carry out, since it not only requires the network management personnel to first consult operating manuals but also laboriously use hands to manually perform the setting procedure. Moreover, the jumper method is highly unsafe since a faulty setting could cause system crash of the server. These drawbacks would make the overall network management unsatisfactorily inefficient.

SUMMARY OF THE INVENTION

It is therefore an objective of this invention to provide a computer platform memory access control method and system with a memory configuration automatic setting capability that allows a server to automatically set the required memory configurations for the memory unit without requiring any human intervention from the network management personnel, so as to make the overall network management more efficient.

The computer platform memory access control method and system according to the invention is designed for use in conjunction with a computer platform, such as a network server equipped with a Lindenhurst chipset developed by the Intel Corporation of USA, for providing the server with a memory configuration automatic setting capability that allows the server to automatically set the required memory configuration in the event that the server's primary memory is changed from one type to another, such as from DDR-266 MHz memory to DDR-333 MHz memory, so that the server can work with the newly-installed memory without manual setting by the user.

The computer platform memory access control method according to the invention comprises: (1) responding to a startup event on the computer platform by accessing via the input/output control chip and the memory control chip to an embedded specification data storage area in the memory unit for the purpose of retrieving a set of memory specification data from the embedded specification data storage area in the memory unit; (2) storing the retrieved memory specification data into the input/output configuration register of the input/output control chip, whereupon the memory specification data stored in the input/output configuration register is automatically mapped via the configuration data exchange path to the memory configuration register in the memory control chip; and (3) responding to a memory access requesting event on the computer platform by performing an access action via the memory control chip to the memory unit based on the memory specification data stored in the memory configuration register of the memory control chip mapped via the configuration data exchange path from the input/output configuration register.

In terms of architecture, the computer platform memory access control system according to the invention comprises: (a) a memory specification data reading module, which is capable of responding to a startup event on the computer platform by accessing via the input/output control chip and the memory control chip to an embedded specification data storage area in the memory unit for the purpose of retrieving a set of memory specification data from the embedded specification data storage area in the memory unit; (b) an input/output configuration setting module, which is capable of storing the memory specification data retrieved by the memory specification data reading module into the input/output configuration register in the input/output control chip, whereupon the memory specification data stored in the input/output configuration register is mapped via the configuration data exchange path to the memory configuration register in the memory control chip; and (c) a memory access module, which is capable of responding to a memory access requesting event on the computer platform by performing an access action via the memory control chip to the memory unit based on the memory specification data stored in the memory configuration register of the memory control chip mapped via the configuration data exchange path from the input/output configuration register.

The computer platform memory access control method and system according to the invention is characterized by the arrangement of a configuration data exchange path between a memory control chip and an I/O control chip on the server's motherboard, so as to allow a set of memory specification data stored in an I/O configuration register of the ICH I/O control chip to be mapped via the configuration data exchange path to a memory configuration register of the memory control chip, such that when the memory control chip is requested to perform a memory access action, it can do so based on the memory specification data stored in its memory configuration register mapped from the ICH I/O control chip. This feature allows a sever to automatically set the required memory configurations for the memory unit currently being in use, without requiring any human intervention from the network management personnel, so that network management can be more efficient than prior art.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The computer platform memory access control method and system with memory configuration automatic setting capability according to the invention is disclosed in full details by way of preferred embodiments in the following with reference to the drawings.

Figure 1:
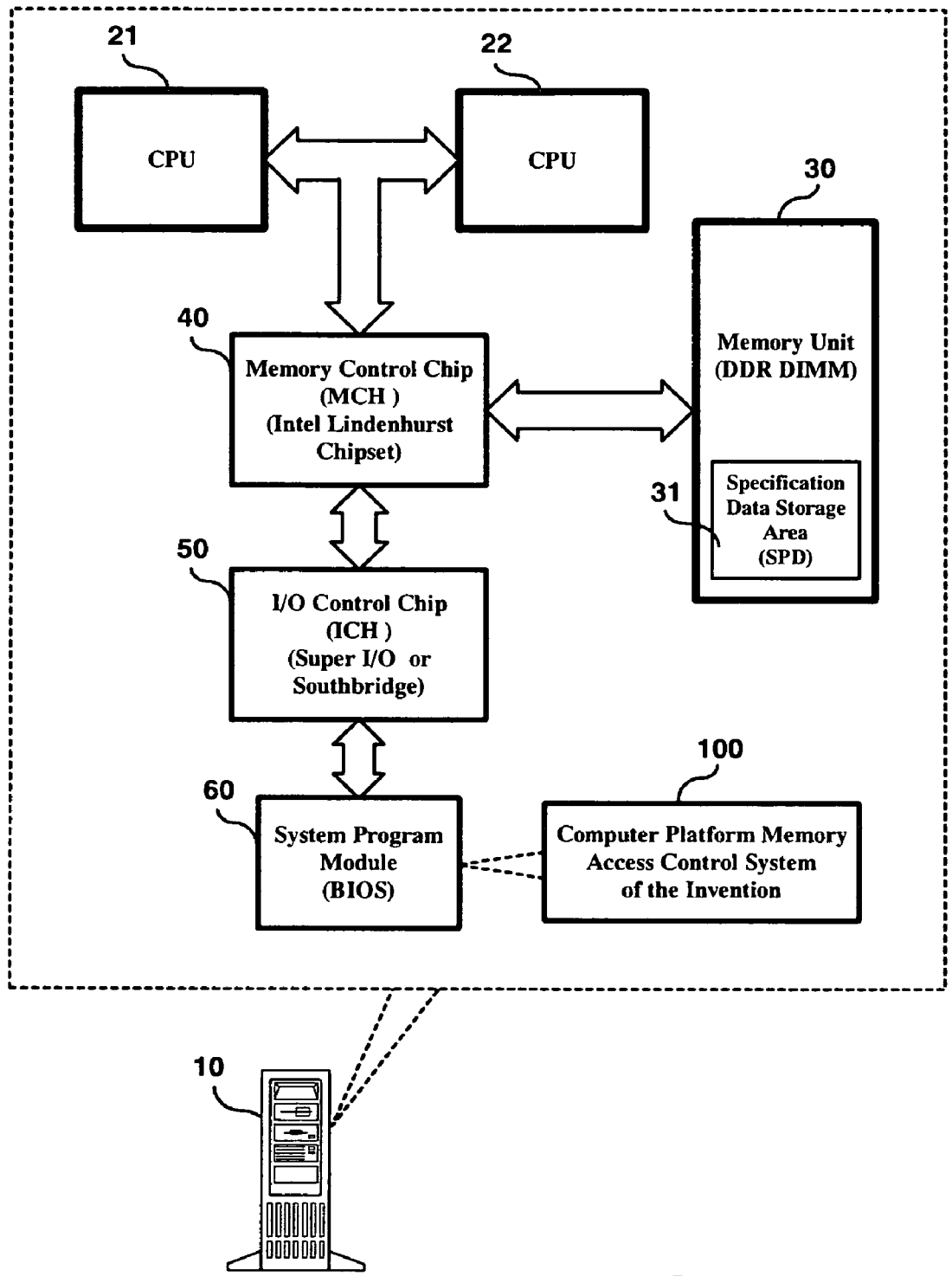
FIG. 1 is a schematic diagram showing the hardware architecture of a computer platform (network server) which is equipped with the computer platform memory access control system according to the invention.

FIG. 1 is a schematic diagram showing a computer motherboard architecture which is equipped with the computer platform memory access control system according to the invention (shown as a block indicated by the reference numeral 100 in FIG. 1). As shown, the computer platform memory access control system of the invention 100 is designed for use in conjunction with a computer platform, such as a network server 10, for providing the server 10 with a memory access control function with memory configuration automatic setting capability. The motherboard of the server 10 is equipped with at least one central processing unit (in the example of the FIG. 1, a dual CPU architecture including two Intel Xeon CPUs 21, 22), a memory unit 30, a memory control chip 40, an I/O (input/output) control chip 50, and a system program module 60 (it is to be noted that the computer motherboard architecture of FIG. 1 may include various other components; but for simplification of description and drawings, only those related to the invention are shown).

In the embodiment of FIG. 1, the memory unit 30 is for example a DDR (Double Data Rate) DIMM (Dual Inline Memory Module) memory module, which can be either a DDR-266 MHz memory module, or a DDR-333 MHz memory module, or other variations. The data about the operating frequency of the memory unit 30 is typically factory-stored in an embedded specification data storage area 31 in the memory unit 30, such as the standardized SPD (Serial Presence Detect) chip on DIMM, such that external circuitry can retrieve the memory specification data from the SPD specification data storage area 31 to learn the particular type of the memory unit 30 being currently in use. The memory specification data include, for example, memory capacity, operating frequency (i.e., DDR-266 MHz or DDR-333 MHz), models, manufacturer, to name a few.

Figure 2:
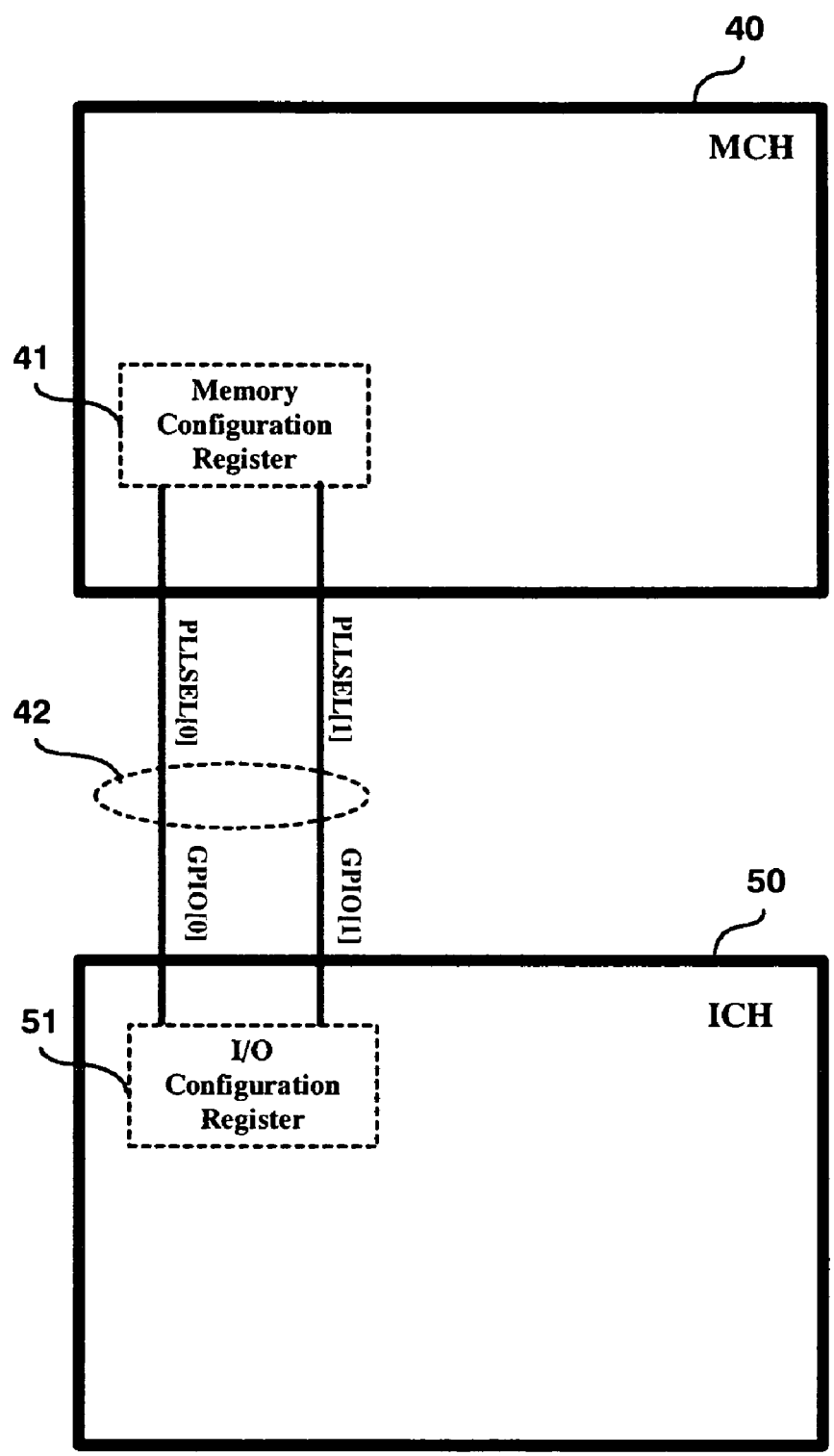
FIG. 2 is a schematic diagram showing a configuration data exchange path prearranged between a memory control chip and an I/O control chip on the computer hardware architecture where the computer platform memory access control system of the invention is integrated.

The memory control chip 40 is for example based on an MCH (Memory Control Hub) architecture developed by the Intel Corporation of USA, such as an Intel's Lindenhurst chipset, for use to control the data exchange between the memory unit 30 and the dual-CPU modules 21, 22 (it is to be noted that the MCH-based memory control chip 40 has various other interface control capabilities, but since these control functions are unrelated to the invention, no description thereof will be given here). As illustrated in FIG. 2, the MCH memory control chip 40 internally includes a memory configuration register 41 for use to store a set of memory specification data about the memory unit 30 (i.e., operating frequency, etc.), and where the memory configuration register 41 can be accessed via the pins PLLSEL[0] and PLLSEL[1] on the Intel's Lindenhurst chipset.

The I/O control chip 50 is for example based on an ICH (I/O Control Hub) architecture developed by the Intel Corporation of USA, such as a Super I/O chipset or a Southbridge chipset, for use to control the data exchange between the system program module 60 (BIOS) and the dual-CPU modules 21, 22 (it is to be noted that the ICH-based I/O control chip 50 has various other interface control capabilities, but since these control functions are unrelated to the invention, no description thereof will be given here). As illustrated in FIG. 2, this ICH I/O control chip 50 internally includes an I/O configuration register 51 for use to store the memory specification data about the memory unit 30 (i.e., operating frequency, etc.), and where the I/O configuration register 51 can be accessed via the pins GPIO[0] and GPIO[1] on the Super I/O chipset or Southbridge chipset.

The system program module 60 is for example a flash memory module which is used to store a BIOS (Basic Input/Output System) program, where the BIOS program can be executed by the dual-CPU modules 21, 22 by accessing via the MCH memory control chip 40 and the I/O control chip 50.

As shown in FIG. 2, it is a prerequisite step before putting the computer platform memory access control system of the invention 100 into operation that a configuration data exchange path 42 should be prearranged between the MCH memory control chip 40 and the ICH I/O control chip 50. This configuration data exchange path 42 can be realized by, for example, interconnecting the PLLSEL[0] and PLLSEL[1] pins on the Intel's Lindenhurst chipset with the GPIO[0] and GPIO [1] pins on the Super I/O chipset or Southbridge chipset. This configuration data exchange path 42 allows the data stored in the I/O configuration register 51 of the ICH I/O control chip 50 to be mapped to the memory configuration register 41 of the MCH memory control chip 40.

Figure 3:
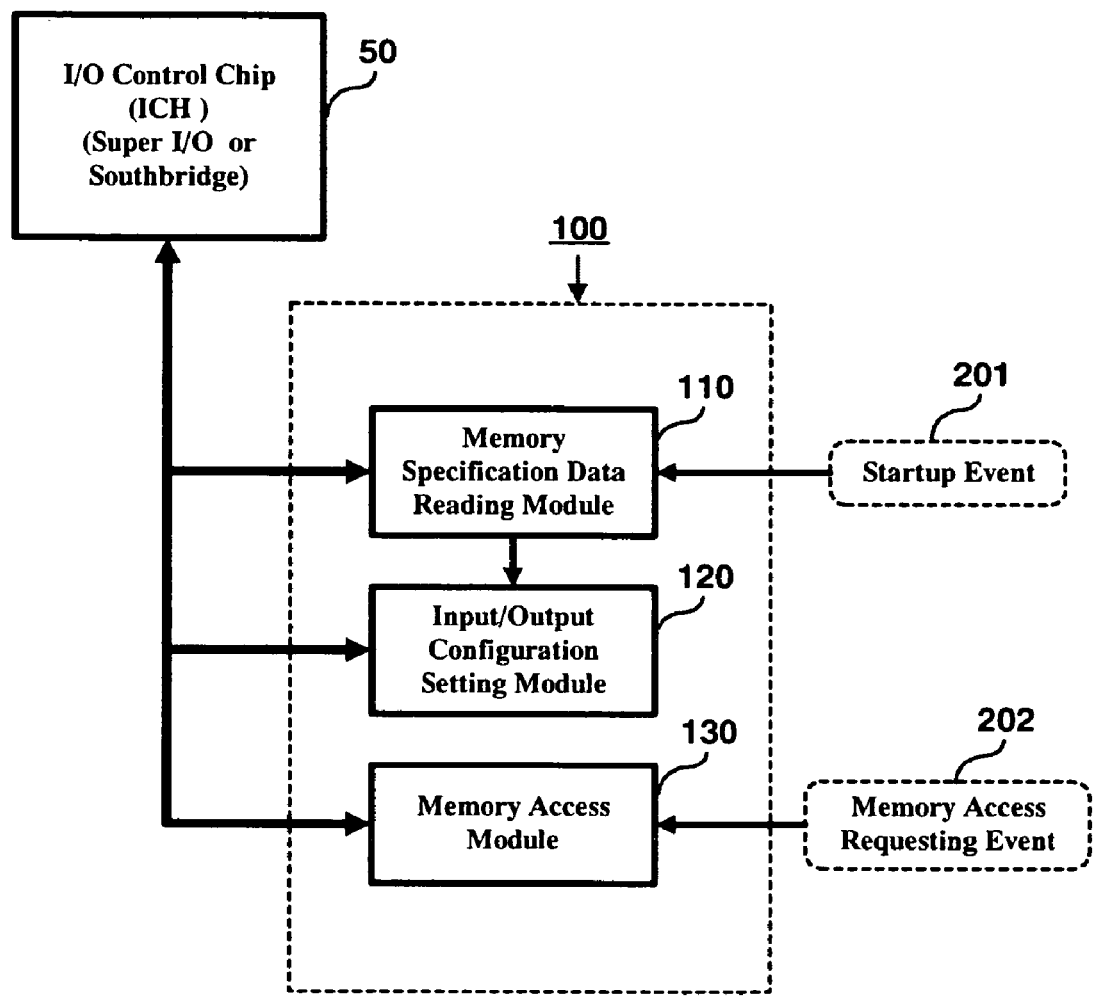
FIG. 3 is a schematic diagram showing the object-oriented component model of the computer platform memory access control system according to the invention.

As shown in FIG. 3, the modularized object-oriented component model of the computer platform memory access control system of the invention 100 comprises: (a) a memory specification data reading module 110; (b) an input/output configuration setting module 120; and (c) a memory access module 130. In practical implementation, for example, these modules 110, 120, 130 can be fully realized by computer code which is integrated as an add-on firmware module to the BIOS module 60 for execution by the dual-CPU modules 21, 22 to provide a memory access control function for the memory unit 30.

Firstly, the respective attributes and functions of the constituent modules 110, 120, 130 of the computer platform memory access control system of the invention 100 are described in details in the following.

The memory specification data reading module 110 is capable of responding to a startup event 201 on the server 10 by accessing via the ICH I/O control chip 50 and the MCH memory control chip 40 to the SPD specification data storage area 31 embedded in the memory unit 30 for the purpose of retrieving a set of memory specification data from the SPD specification data storage area 31. The retrieved memory specification data indicates whether the memory unit 30 is a DDR-266 MHz or DDR-333 MHz memory module.

The input/output configuration setting module 120 is capable of registering the memory specification data retrieved by the memory specification data reading module 110 into the input/output configuration register 51 of the ICH I/O control chip 50. Since the I/O configuration register 51 of the ICH I/O control chip 50 is prearranged to be connected via the configuration data exchange path 42 to the memory configuration register 41 of the MCH memory control chip 40, it allows the memory specification data stored in the I/O configuration register 51 of the ICH I/O control chip 50 to be mapped via the configuration data exchange path 42 to the memory configuration register 41 of the MCH memory control chip 40.

The memory access module 130 is capable of responding to a memory access requesting event 202 on the server 10 by performing an access action via the memory control chip 40 to the memory unit 30 based on the memory specification data registered in the memory configuration register 41 of the memory control chip 40 mapped via the configuration data exchange path 42 from the input/output configuration register 51.

In the following detailed description of an example of a practical application of the invention, it is assumed that the user (i.e., network management personnel) initially installs a DDR-266 MHz memory module as the memory unit 30 on the server 10.

Referring to FIG. 1 through FIG. 3 together, in actual operation, as the network management personnel has installed the DDR-266 MHz memory unit 30 on the server 10 and switched on the server 10, it initiates a startup event 201 on the server 10, causing the memory specification data reading module 110 in the computer platform memory access control system of the invention 100 to respond by accessing via the ICH I/O control chip 50 and the MCH memory control chip 40 to the SPD specification data storage area 31 embedded in the memory unit 30 for the purpose of retrieving a set of memory specification data from the SPD specification data storage area 31 in the memory unit 30. The retrieved memory specification data indicates that the memory unit 30 is a DDR-266 MHz type. Subsequently, the input/output configuration setting module 120 is activated to store the memory specification data retrieved by the memory specification data reading module 110 into the input/output configuration register 51 of the ICH I/O control chip 50. Since the I/O configuration register 51 of the ICH I/O control chip 50 is prearranged to be connected via the configuration data exchange path 42 to the memory configuration register 41 of the MCH memory control chip 40, it allows the memory specification data stored in the I/O configuration register 51 of the ICH I/O control chip 50 to be mapped via the configuration data exchange path 42 to the memory configuration register 41 of the MCH memory control chip 40.

When the dual-CPU modules 21, 22 want to gain access to the memory unit 30, a memory access requesting event 202 is initiated, causing the memory access module 130 to respond by performing a DDR-266 MHz access action via the MCH memory control chip 40 to the memory unit 30 based on the DDR-266 MHz memory specification data stored in the memory configuration register 41 of the MCH memory control chip 40 mapped via the configuration data exchange path 42 from the input/output configuration register 51 of the ICH I/O control chip 50.

Afterwards, if the network management personnel replaces the DDR-266 MHz memory unit 30 with a DDR-333 MHz memory module, then in a similar manner, a startup event 201 on the server 10 will cause the memory specification data reading module 110 to respond by accessing via the ICH I/O control chip 50 and the MCH memory control chip 40 to the SPD specification data storage area 31 embedded in the DDR-333 MHz memory unit 30 for the purpose of retrieving a set of memory specification data from the SPD specification data storage area 31 in the DDR-333 MHz memory unit 30. Subsequently, the input/output configuration setting module 120 is activated to store the memory specification data retrieved by the memory specification data reading module 110 into the input/output configuration register 51 of the ICH I/O control chip 50. When the dual-CPU modules 21, 22 want to gain access to the newly-replaced DDR-333 MHz memory unit 30, a memory access requesting event 202 is initiated, causing the memory access module 130 to respond by performing a DDR-333 MHz access action via the MCH memory control chip 40 to the memory unit 30 based on the DDR-266 MHz memory specification data registered in the memory configuration register 41 of the MCH memory control chip 40 mapped via the configuration data exchange path 42 from the input/output configuration register 51 of the ICH I/O control chip 50.

In conclusion, the invention provides a computer platform memory access control method and system for use with a computer platform, such as a network server, for providing the server with a memory access control function with memory configuration automatic setting capability, which is characterized by the arrangement of a configuration data exchange path between a memory control chip and an I/O control chip on the server's motherboard, so as to allow a set of memory specification data stored in an I/O configuration register of the ICH I/O control chip to be mapped via the configuration data exchange path to a memory configuration register of the memory control chip, such that when the memory control chip is requested to perform a memory access action, it can do so based on the memory specification data stored in its memory configuration register mapped from the ICH I/O control chip. This feature allows a sever to automatically set the required memory configurations for the memory unit currently being in use, without requiring any human intervention from the network management personnel, so that network management can be made more efficient. The invention is therefore more advantageous to use than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A computer platform memory access control method for use on a computer platform for providing the computer platform with a memory access control function with a memory configuration automatic setting capability, wherein the computer platform is equipped with at least one central processing unit, a memory unit, a memory control chip, and an input/output control chip, and wherein between the memory control chip and the input/output control chip is there prearranged with a configuration data exchange path for an input/output configuration register in the input/output control chip to be mapped via the configuration data exchange path to a memory configuration register in the memory control chip;

the computer platform memory access control method comprising:

responding to a startup event on the computer platform by accessing via the input/output control chip and the memory control chip to an embedded specification data storage area in the memory unit for the purpose of retrieving a set of memory specification data from the embedded specification data storage area in the memory unit;

storing the retrieved memory specification data into the input/output configuration register of the input/output control chip, whereupon the memory specification data stored in the input/output configuration register is automatically mapped via the configuration data exchange path to the memory configuration register in the memory control chip; and responding to a memory access requesting event on the computer platform by performing an access action via the memory control chip to the memory unit based on the memory specification data stored in the memory configuration register of the memory control chip mapped via the configuration data exchange path from the input/output configuration register.

2. The computer platform memory access control method of claim 1, wherein the computer platform is a network server.

3. The computer platform memory access control method of claim 1, wherein the memory unit is a DDR (Double Data Rate) DIMM (Dual Inline Memory Module) memory module.

4. A computer platform memory access control system for use with a computer platform for providing the computer platform with a memory access control function with a memory configuration automatic setting capability, wherein the computer platform is equipped with at least one central processing unit, a memory unit, a memory control chip, and an input/output control chip, and wherein between the memory control chip and the input/output control chip is there prearranged with a configuration data exchange path for an input/output configuration register in the input/output control chip to be mapped via the configuration data exchange path to a memory configuration register in the memory control chip;

the computer platform memory access control system comprising:

a memory specification data reading module, which is capable of responding to a startup event on the computer platform by accessing via the input/output control chip and the memory control chip to an embedded specification data storage area in the memory unit for the purpose of retrieving a set of memory specification data from the embedded specification data storage area in the memory unit;

an input/output configuration setting module, which is capable of storing the memory specification data retrieved by the memory specification data reading module into the input/output configuration register in the input/output control chip, whereupon the memory specification data stored in the input/output configuration register is mapped via the configuration data exchange path to the memory configuration register in the memory control chip; and a memory access module, which is capable of responding to a memory access requesting event on the computer platform by performing an access action via the memory control chip to the memory unit based on the memory specification data stored in the memory configuration register of the memory control chip mapped via the configuration data exchange path from the input/output configuration register.

5. The computer platform memory access control system of claim 4, wherein the computer platform is a network server.

6. The computer platform memory access control system of claim 4, wherein the memory unit is a DDR (Double Data Rate) DIMM (Dual Inline Memory Module) memory module.

* * * * *